April 17, 1962     Z. A. KULAR     3,029,941
DEVICE FOR SORTING BY IMPEDANCE CHARACTERISTICS
Filed March 20, 1959     4 Sheets-Sheet 1
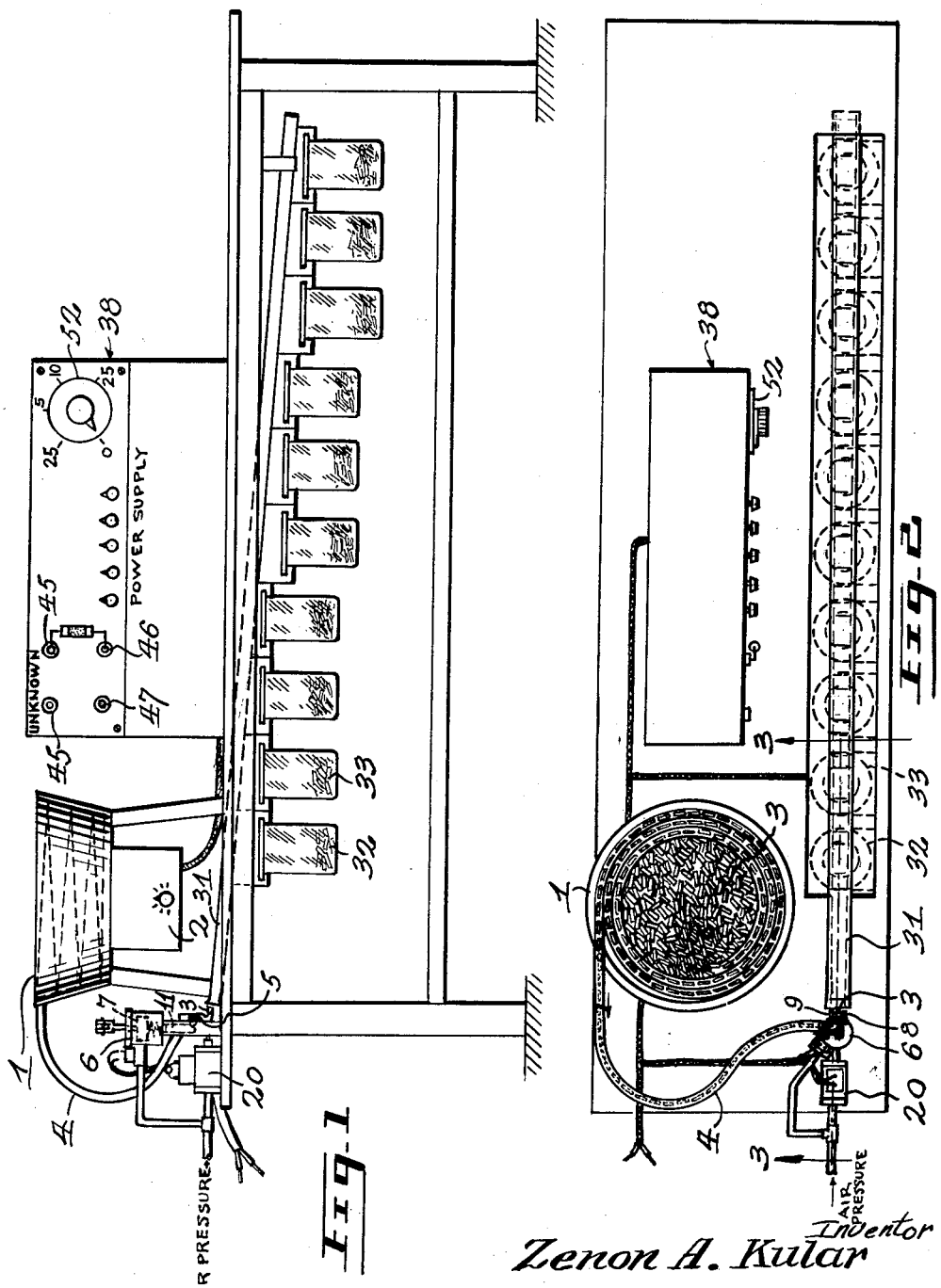
Inventor
Zenon A. Kular
By Robert B. Harmon
Attorney April 17, 1962   Z. A. KULAR   3,029,941
DEVICE FOR SORTING BY IMPEDANCE CHARACTERISTICS
Filed March 20, 1959   4 Sheets-Sheet 2

Inventor
Zenon A. Kular
By Robert B. Harrison
Attorney

April 17, 1962 — Z. A. KULAR — 3,029,941
DEVICE FOR SORTING BY IMPEDANCE CHARACTERISTICS
Filed March 20, 1959 — 4 Sheets-Sheet 3
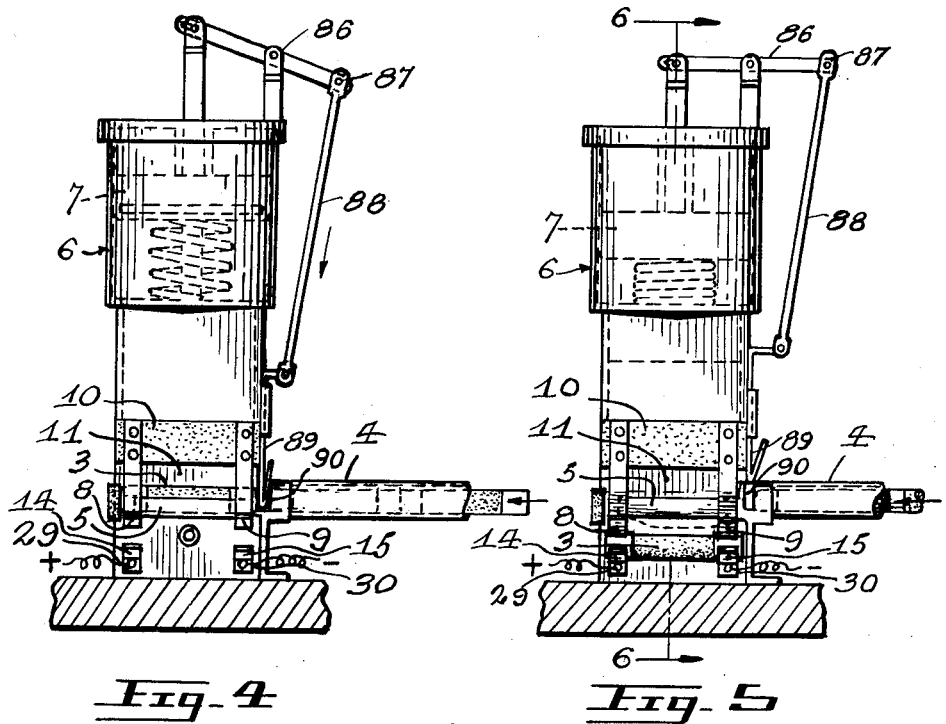
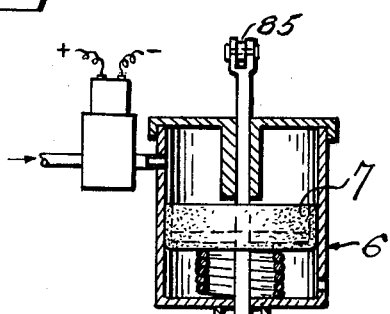
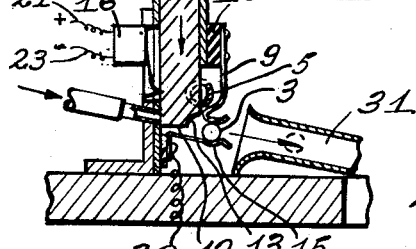
Inventor
Zenon A. Kular
By Robert B. Harmon
Attorney Inventor
Zenon A. Kular
By Robert B. Harmon
Attorney United States Patent Office 3,029,941
Patented Apr. 17, 1962

3,029,941
DEVICE FOR SORTING BY IMPEDANCE CHARACTERISTICS
Zenon A. Kular, Dorval, Quebec, Canada, assignor to Northern Electric Company, Limited, Montreal, Quebec, Canada, a corporation of Canada
Filed Mar. 20, 1959, Ser. No. 800,798
7 Claims. (Cl. 209—81)

This invention relates to electrical systems and more particularly to systems for automatic electrical testing, classifying and segregating elements in accordance with their impedance characteristics.

In the manufacture of electrical elements, such as resistors, capacitors and the like, it is common practice to test these elements and segregate them into groups in accordance with their impedance characteristics. Some of the previous methods for this purpose involved the employment of elements individual to each range of classification of the elements under test resulting in slowness in the operation.

It is an object of this invention to provide an improved electrical system for rapid testing, classifying and segregation of elements automatically and continuously in accordance with their impedance characteristics.

It is another object of this invention to provide a system, having the foregoing characteristic, which is economical to construct and operate.

These and other objects of this invention are attained by providing an electrical system having in combination: means for successively supplying to a testing position elements to be classified, orientated in a predetermined position from a promiscuous arrangement of the elements; comparison bridge means for comparing the impedance of the element under test with that of a standard element; means for applying the unbalanced voltage, derived from the bridge means, and a reference potential to a phase responsive device in order to obtain a difference of net voltage; means for applying this net voltage to actuate a device, commensurate with the net voltage, which causes the element under test to be segregated and deposited in a container with respect to the classification into which the element falls.

A better understanding of the invention may be had by referring to the following description, taken in conjunction with the drawings in which like numbers refer to like parts, in which:

FIG. 1 shows a side view, in elevation, of the assembly of the apparatus in which the invention is represented;

FIG. 2 shows a plan view of the assembly of the apparatus in which the invention is represented;

FIG. 3 is a sectional view taken on the line 3—3, in the direction of the arrows of FIG. 2;

FIG. 3A shows the electrical connections for the timer employed in the invention;

FIG. 4 shows a front view, in elevation, of the air-motor, employed in the apparatus of this invention, when the element under test is in the position prior to it being admitted to its clamping position;

FIG. 5 shows a front view, in elevation, of the air-motor employed in the apparatus of the invention when the element under test is in the clamping position;

FIG. 6 shows a view in elevation, taken on line 6—6 in the direction of the arrows, FIG. 5;

Figure 7:
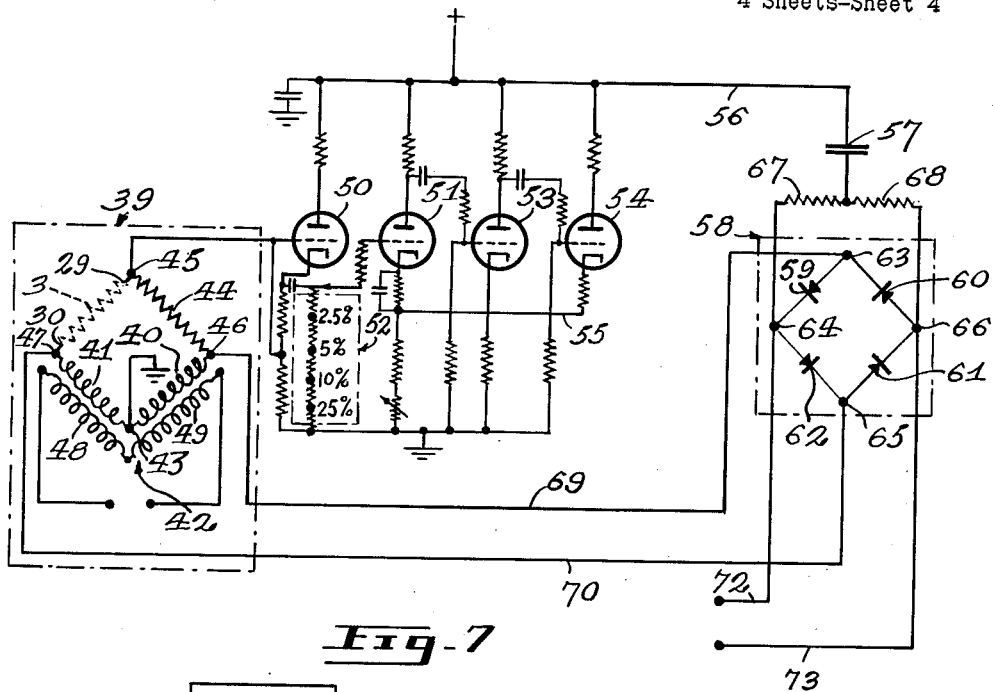
FIG. 7 shows a schematic circuit diagram of a balanced A.C. bridge circuit employed in the invention.

Considering FIGS. 1 to 6 of the drawings, there is shown a hopper 1 actuated by motor 2, adapted to deliver resistor 3 under test, through channel 4 to lip 5 orientated in the correct position, the lip 5 being made from a flexible material such as saran.

As shown particularly in FIGS. 4, 5, 6, the clamping assembly includes a two-way air-motor 6, actuated by means of air valve 27, equipped with piston 7 to which is secured clamping member 11. Clamping member 11 is provided with an edge and curved face 12, 13 respectively adapted, when driven downward, to engage clamping springs 8, 9 so that resistor 3 under test is clamped between such springs 8, 9 and the contact springs 14, 15. Springs 8, 9 are secured to insulator 10 suitably mounted on the air-motor 6 and contact springs 14, 15 have affixed thereto conductors 29, 30. The clamping assembly is also provided with a micro-switch 16 adapted to be actuated by the movement of clamping member 11 in engagement with the lever 28 of the switch 16.

Referring now to FIG. 3A of the drawings, there is shown electronic timer 17, which may be of the type known in the trade as the Farmer Electric Timer, CK Model 2, Style 2, which is generally described in U.S. Patent 2,650,301 to E. B. Farmer, August 25, 1953, FIG. 2. Associated with timer 17 is one-way air valves 20 and 27, and micro-switch 16, these elements being connected together by conductors 21, 21', 22, 23, 24, 25, 26.

In FIGS. 1, 2 and 3 there is shown conveying means 31 on which are disposed similar removable containers, for examples, 32, 33 each having a hinged door 34, 35 respectively, each of the doors 34, 35 being actuated by solenoids 36, 37 respectively, protected by guards 36' and 37'.

In FIGS. 1 and 2 there is also shown control cabinet 38 in which the control apparatus is disposed.

Considering FIG. 7 there is shown a balanced alternating current bridge circuit, generally shown by the numeral 39, provided with inductance elements 40, 41, equal in inductance value and forming the secondary winding of the transformer 42, joined at the junction point 43, and grounded thereat, to form one pair of the ratio arms of the bridge circuit 39. The bridge circuit 39 is also provided with resistor 44 having the desired calibration, joined with the resistor 3 under test at the junction point 45 to form the other pair of the ratio arms of the bridge circuit 39 which is completed by connecting the pairs of ratio arms at the junction points 46, 47. The bridge circuit 39 may be excited from a 110 volt A.C. commercial energy source impressed through the primary windings 48, 49 of the transformer 42.

The junction point 45, FIG. 7, is directly connected to the grid of the first stage amplifier electron tube 50, which is a cathode follower. The output of the first stage, tube 50, is also coupled to the voltage divider 52 sectionalized so that it can be combined to apply a predetermined biasing potential to the grid of electron tube 51. Amplifier, stages, electron tubes 51, 53, 54, are coupled together with the first stage, tube 50, and are conventional amplifiers. A feedback from the fourth stage, tube 54, is applied to the input of the second stage, tube 51, by conductor 55.

The anode of the tube 54 is also connected through conductor 56 and capacitor 57 to a phase sensitive detector, generally shown by the numeral 58, consisting of a bridge rectifier of four diodes 59, 60, 61, 62, the arms being joined at the junction points 63, 64, 65, 66, through resistors 67, 68 equally dividing the voltage applied to the junction points 64, 66 of the phase sensitive detector 58. The junction points 63, 65 of the detector 58 are connected to the junction points 46, 47 respectively of the bridge 39 through conductors 69, 70 respectively.

Figure 8:
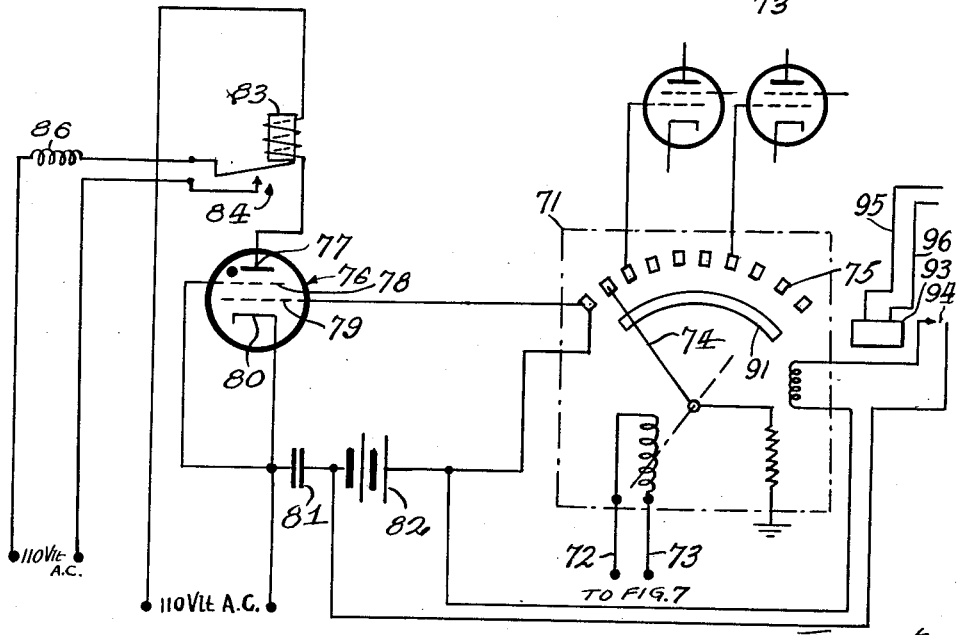
FIG. 8 shows a schematic circuit diagram of a meter relay employed in the invention.

There is shown in FIG. 8, meter relay 71 such as described in Data Sheet 4-B, March 1958, published by Assembly Products Inc., connected to junction points 64, 66 of phase sensitive detector 58 by conductors 72, 73 respectively, having pointer 74 in slidable contactional engagement with contacts 75. The meter relay 71 is also provided with a clamper bar 91 actuated by electromagnet 92. Associated with electromagnet 92 is relay 93 arranged so that, when its normally open contacts 94 are closed, the electromagnet 92 is energized from energy source 82. Relay 93 is connected to the timer 17, FIG. 3, through conductors 95, 96. Each of the contacts 75 are connected to an individual circuit consisting of a thyratron tube 76 having an anode 77, control grid 78, firing grid 79 and cathode 80, a stabilizing capacitor 81, energy source 82, a relay 83 having normally open contacts 84 to which is connected a solenoid 85, the tube 76 and solenoid 85 being energized by a 110 volt A.C. circuit. There is a similar thyratron circuit and associated solenoid, door and container associated with each of the ten contacts 75 of the meter relay 71.

As shown in FIG. 4, link mechanism is provided having link members 86, 87, 88 and gate 89, attached to link 86 so as to engage with an opening 90 in the channel 4.

In the operation of the system, a quantity of resistors 3, in random or jumbled relation with each other, is deposited on the floor of the hopper 1 which is agitated by applying energy from the power source so that a resistor 3 is delivered to the lip 5 of the channel 4 orientated in the proper position. By adjusting the speed of the motor 2, the rate at which the resistors 3 are delivered to the test position can be regulated. In order to advance the resistors 3 to the test position, micro-switch 16, FIG. 3 is manually operated, which action energizes timer 17, FIG. 3A, and allows its contacts S4 to close. The closing of contacts S4 of timer 17, allows air valve 27, FIG. 3 to be actuated. The actuating of air valve 27, permits piston 7, with its associated clamping member 11, to be driven in a downward direction, permitting the flexing of the lip 5 of channel 4 so as to free resistor 3 and, as the clamping member 11 continues in its downward movement, allows the edge 12 of clamping member 11 to engage with one of the extremities of contact springs 14, 15, so that they move a predetermined distance apart from the clamping springs 8, 9. This action permits the resistor 3 to engage with the curved portion 13 of clamping member 11, so that the resistor 3 is projected into the curved portions of the clamping and contact springs 8, 9 and 14, 15 respectively. At this stage of the operation, air-valve 20 and clamping relay 93, FIG. 8, are not energized. The link mechanism 86, 87, 88 actuates on the downward movement of piston 6 to remove the gate 89 from the opening 90 from the channel 4 so that a new resistor 3 will be admitted into lip 5 of channel 4.

If the electrical values of the two components are not equal, a small balance potential will appear at the junction 46, 47 of the bridge circuit 39. It will be observed that the polarity of the voltage depends on whether the value of the unknown component, 3, is larger or smaller than the known component 44. It now becomes necessary to have a device which will compensate the phase relation of this unbalance potential with that of a reference potential. This unbalance potential is therefore applied to the junction points 64, 66 of the phase sensitive detector 58, after being amplified, then passed on through conductor 56, capacitor 57 and resistors 67, 68 the latter dividing the current flowing to these junctions' points, the circuit being 45—50—51—53—54—56—57—68—66—60—63—69—46—40—ground at transformer 42—ground at cathode for amplifier tubes 50 to 54 and from 45—50—51—53—54—56—57—67—64—62—65—70—47—41—ground at transformer 42—ground at cathode of amplifier tubes 50 to 54. The unbalanced potential at the junction points 64, 66 is either in or out of phase with the reference voltage across the secondary winding 40, 41 of transformer 42, that is, across the junction points 63, 65 of the phase detector.

The phase detector 58 is, in effect, a modulator circuit with two inputs and one output, the output arranged to give an indication of the phase difference between the two inputs at the same frequency. The transformer 42 is employed to permit the connection of unbalanced inputs. Since the input voltages are fixed in amplitude, the D.C. output is proportional to the cosines of the phase difference between the inputs. The rectifiers (diodes 59, 60, 61, and 62) are matched to possess constant forward and reverse impedances. Switching of the diodes is due to the polarity of the switching voltage. The change-over from forward to reverse resistance is assumed to occur at zero voltage.

When the pointer 74 is advanced to a contact 75 on the meter-relay 71, FIG. 8, it is clamped in this position by the clamping bar 91. This action is due to the opening of switch S3 and the closing of switch S4, FIG. 3A, in view of the delay action of the timer 17.

When the pointer 74 is advanced to a contact on meter-relay 71, the holding or a gate potential on grid 79 is directed to ground, the path being 79—75—74 limiting resistor and ground, so that the thyratron tube 76 conducts. When the pointer 74 of meter-relay 71 comes to rest on a contact 75, commensurate with the resistance characteristic of the resistor 3 under test, affected by net direct current derived from the phase sensitive detector 58, energy supply 82 is by-passed so that thyratron tube 76 conducts causing relay 83 to energize, permitting contacts 84 to close, solenoid 36 to energize so that door 34 of container 32 opens.

When the door 34 opens the piston 7, with the clamping member 11, has been driven downward to a point where micro-switch 16, FIG. 3, is actuated which cuts off the energy supplied to timer 17 so that spring of air motor 6, allows the piston 7 and the clamping member 11 to return to their original position. Relay 93, FIG. 8, is also deenergized so that the clamping bar 91 of meter-relay 71 is released. With the deenergizing of timer 17, switch S4 closes actuating air valve 20 so that the resistor 3 under test is propelled down the conveyor 31.

A similar operation applies with respect to the remaining thyratron tubes.

By adjusting voltage divider 52, FIG. 7, the range of divergence from the standard resistor desired may be set.

Various types of resistors, capacitors, etc. may be tested, classified and segregated by modifying clamping assembly 11, clamping springs 8, 9 and contact springs 14, 15.

What is claimed is:

1. A system for electrically testing, classifying and segregating a plurality of electrical elements in accordance with their impedance characteristic comprising in combination: a four-arm impedance bridge circuit; means for automatically feeding the elements, in succession, from a promiscuous arrangement, in a predetermined orientated position to a testing position; clamping means to clamp the element to be tested in the unknown arm of the bridge circuit; a continuous phase sensitive detector for classifying the element; means for applying the unbalance output of the bridge circuit to the phase sensitive detector; a source of alternating current of a predetermined frequency to inductively energize the bridge; means for energizing the phase sensitive detector from the same input source of alternating current; a meter-relay means for indicating the phase relation between the unbalance output of the bridge circuit and the predetermined phase, responsive to the output from the phase sensitive detector to which it is connected and having a pointer in slidable engagement with a series arrangement of contacts; a plurality of closed individual electrical circuits in which are included individually said contacts and a switching means comprising an electronic discharge tube; energizing means for the circuits whereby the discharge tube is normally conducting; means connected to the pointer adapted to deenergize a predetermined circuit when the pointer is in engagement with the contact included therein; a grouping mechanism including a series of devices individually responsive to the switching means and adapted, when operated, to receive the element after test; a conveying means; timing means connected to the clamping means arranged to clamp and release the element under test from the unknown arm of the bridge circuit at predetermined times; timing means adapted to eject the element from the bridge circuit and propel it to the receiving means at a predetermined time.

2. A system in accordance with claim 1 which includes also an amplifying means for amplifying the output from said bridge and means therein for adjusting the limits of impedance within which the element under test falls.

3. A system in accordance with claim 1 in which the grouping mechanism comprises an electrical responsive means included in the output of the said switching means, adapted to condition the desired container for the reception of the classified element.

4. A system in accordance with claim 2, in which said amplifying means includes a negative feedback.

5. A mechanism adapted to segregate a plurality of electrical elements in accordance with their electrical characteristics which comprises in combination: a meter-relay having a series arrangement of contacts and a pointer adapted to move in slidable engagement thereover; a plurality of closed electrical circuits in each of which is included one of said contacts and an electronic discharge tube; means to energize the circuits, so that the discharge tube is normally conducting; means connected to the pointer to deenergize a predetermined circuit when the pointer is in engagement with the contact included in that circuit; a grouping means comprising a relay, having normally open contacts, in the output circuit of the discharge tube; a series arrangement of receiving means and energizing means therefor adapted to be applied to the receiving means upon the deenergization of the electronic discharge tube.

6. A system for testing, sorting, classifying and segregating a plurality of electrical elements in accordance with their impedance characteristics comprising in combination: a magazine in which the electrical elements are promiscuously disposed, a test position provided with a pair of terminals, means for successively advancing the electrical elements to the test position in a predetermined oriented position, a pneumatic cylinder having a piston rod adapted, when reciprocated, to clamp the electrical elements in the pair of terminals at the test position, a first control means for controlling the actuation of the piston, a chute adjacent the test position in which the electrical elements gravitate when released from the test position, a second pneumatic control means for projecting the electrical elements down the chute, a plurality of hinged closure members regularly spaced on the chute, individual actuating means to open and close the closure members; a four arm impedance bridge circuit having in one arm the electrical element with which the tested electrical element is to be compared and in another arm a pair of test terminals, means for connecting the pair of terminals to the test terminals, oscillating energizing means, means for inductively applying the energizing means to the bridge circuit; a continuous phase sensitive detector connected to the bridge circuit; a meter relay for indicating the phase relation between the unbalance output of the bridge circuit and the predetermined phase, responsive to the output from the phase sensitive detector to which it is connected, having a pointer in slidable engagement with a plurality of contacts, a clamping means, a third control means to clamp the clamping means in a fixed position to the pointer; a plurality of closed individual electrical circuits in which are included individually said contacts and a switching means, including an electronic discharge tube, connected to the actuating means; energizing means for the circuits whereby the discharge tube is normally conducting; a timing means, connected to the control means.

7. A system as defined in claim 6 having in combination therewith an amplifying means which includes a first and second stage electronic amplifier interconnected to the bridge circuit and the phase detector respectively, each electronic amplifier having at least a control electrode, an anode and a cathode, a divider connected in the output of the first stage having a plurality of tap positions to effect multiple ranges of the bridge circuit.

References Cited in the file of this patent

UNITED STATES PATENTS

| | | |
|---|---|---|
| 2,237,254 | Broekhuysen | Apr. 1, 1941 |
| 2,357,801 | Arelt | Sept. 12, 1944 |
| 2,430,080 | Reynolds | Nov. 4, 1947 |
| 2,468,843 | Sunstein | May 3, 1949 |
| 2,479,051 | Sunstein | Aug. 16, 1949 |
| 2,566,767 | Hunt | Sept. 4, 1951 |